(12) United States Patent
Seetharamaiah et al.

(10) Patent No.: US 12,353,603 B2
(45) Date of Patent: Jul. 8, 2025

(54) SIGNED COMMAND STREAM AND COMMAND EXECUTION

(71) Applicant: QUALCOMM Incorporated, San Diego, CA (US)

(72) Inventors: Avinash Seetharamaiah, San Diego, CA (US); Murat Balci, San Diego, CA (US); Jonnala Gadda Nagendra Kumar, San Diego, CA (US); Nigel Poole, West Newton, MA (US); Abhiraj Deshpande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 353 days.

(21) Appl. No.: 17/070,734

(22) Filed: Oct. 14, 2020

(65) Prior Publication Data

US 2022/0114284 A1 Apr. 14, 2022

(51) Int. Cl.
| | |
|---|---|
| *G06F 21/64* | (2013.01) |
| *G06F 21/52* | (2013.01) |
| *G06F 21/56* | (2013.01) |
| *G06F 21/71* | (2013.01) |

(52) U.S. Cl.
CPC .............. *G06F 21/64* (2013.01); *G06F 21/52* (2013.01); *G06F 21/566* (2013.01); *G06F 21/71* (2013.01)

(58) Field of Classification Search
CPC ........ G06F 21/64; G06F 21/52; G06F 21/566; G06F 21/71
See application file for complete search history.

(56) References Cited

U.S. PATENT DOCUMENTS

| | | | |
|---|---|---|---|
| 2012/0176386 A1* | 7/2012 | Hutchins | G06T 1/20 345/522 |
| 2014/0044265 A1 | 2/2014 | Kocher et al. | |
| 2015/0187123 A1 | 7/2015 | Hwang et al. | |

(Continued)

FOREIGN PATENT DOCUMENTS

| | | |
|---|---|---|
| CN | 107783782 B | 3/2019 |
| TW | 201531857 A | 8/2015 |

OTHER PUBLICATIONS

International Search Report and Written Opinion—PCT/US2021/051131—ISA/EPO—Jan. 4, 2022.
Taiwan Search Report—TW110135108—TIPO—Mar. 17, 2025.

*Primary Examiner* — Huan V Doan
(74) *Attorney, Agent, or Firm* — Polsinelli

(57) ABSTRACT

Systems, methods, and computer-readable media are provided for signing and executing graphics processing unit (GPU) commands. In some examples, a method can include receiving, by a GPU, one or more commands including one or more verification signatures generated using a processor, each verification signature of the one or more verification signatures including a first value generated based on the one or more commands; generating, by the GPU, one or more additional verification signatures associated with the one or more commands, wherein each verification signature of the one or more additional verification signatures includes a second value generated by the GPU based on the one or more commands; and determining, by the GPU, a validity of the one or more commands based on a comparison of the one or more verification signatures and the one or more additional verification signatures.

30 Claims, 7 Drawing Sheets

(56) References Cited

U.S. PATENT DOCUMENTS

2017/0083998 A1* 3/2017 Acharya .................... G06T 1/60
2018/0205553 A1* 7/2018 Hoppert .................. G06F 21/51
2020/0127836 A1* 4/2020 Pappachan .............. G06F 21/71

* cited by examiner

SIGNED COMMAND STREAM AND COMMAND EXECUTION

TECHNICAL FIELD

The present disclosure generally relates to graphics processing systems, and more specifically to signing and executing graphics processor command streams.

BACKGROUND

Specialized processors, such as graphics processing units (GPUs), are increasingly used to perform specific operations in a computer system. For example, GPUs are very efficient at manipulating computer graphics and image processing. The highly parallel structure of GPUs allows GPUs to be more efficient than many other processors for algorithms that process large blocks of data in parallel. Accordingly, GPUs are commonly used to process computer graphics and render graphics content for presentation on a display device. Moreover, GPUs often work in coordination with other processors, such as a central processing unit (CPU), to execute computer applications more efficiently and offload certain processing tasks. In some examples, a CPU can send one or more command streams to the GPU, which the GPU can execute as part of a computer application executed by the CPU and the GPU.

BRIEF SUMMARY

Disclosed herein are systems, methods, and computer-readable media for signing and executing graphics processing unit (GPU) command streams. According to at least one example, a method is provided for signing and executing GPU command streams. An example method can include receiving, by a graphics processing unit (GPU), one or more commands including one or more verification signatures generated using a processor, each verification signature of the one or more verification signatures including a first value generated based on the one or more commands; generating, by the GPU, one or more additional verification signatures associated with the one or more commands, wherein each verification signature of the one or more additional verification signatures includes a second value generated by the GPU based on the one or more commands; and determining, by the GPU, a validity of the one or more commands based on a comparison of the one or more verification signatures and the one or more additional verification signatures.

According to at least some examples, apparatuses are provided for signing and executing GPU command streams. In one example, an example apparatus can include memory and one or more processors configured to receive, by a graphics processing unit (GPU), one or more commands including one or more verification signatures generated using a processor, each verification signature of the one or more verification signatures including a first value generated based on the one or more commands; generate, by the GPU, one or more additional verification signatures associated with the one or more commands, wherein each verification signature of the one or more additional verification signatures includes a second value generated by the GPU based on the one or more commands; and determine, by the GPU, a validity of the one or more commands based on a comparison of the one or more verification signatures and the one or more additional verification signatures.

In another example, an example apparatus can include means for receiving, by a graphics processing unit (GPU), one or more commands including one or more verification signatures generated using a processor, each verification signature of the one or more verification signatures comprising a first value generated based on the one or more commands; generating, by the GPU, one or more additional verification signatures associated with the one or more commands, wherein each verification signature of the one or more additional verification signatures includes a second value generated by the GPU based on the one or more commands; and determining, by the GPU, a validity of the one or more commands based on a comparison of the one or more verification signatures and the one or more additional verification signatures.

According to at least one example, non-transitory computer-readable media are provided for signing and executing GPU command streams. An example non-transitory computer-readable medium can store instructions that, when executed by one or more processors, cause the one or more processor to receive, by a graphics processing unit (GPU), one or more commands including one or more verification signatures generated using a processor, each verification signature of the one or more verification signatures including a first value generated based on the one or more commands; generate, by the GPU, one or more additional verification signatures associated with the one or more commands, wherein each verification signature of the one or more additional verification signatures includes a second value generated by the GPU based on the one or more commands; and determine, by the GPU, a validity of the one or more commands based on a comparison of the one or more verification signatures and the one or more additional verification signatures.

In some aspects, determining the validity of the one or more commands as described in the method, apparatuses, and computer-readable medium described above can include determining that the first value associated with the one or more verification signatures matches the second value associated with the one or more additional verification signatures; and determining the one or more commands are valid. In some examples, determining the one or more commands are valid can result in (and/or include) determining that the one or more commands are authorized for execution by the GPU, determining an integrity of the one or more commands, and/or determining that the one or more commands do not include unauthorized alterations.

In some aspects, the method, apparatuses, and computer-readable medium described above can include authorizing, based on the one or more commands being valid, execution of the one or more commands at the GPU.

In some cases, determining the validity of the one or more commands can include determining that the first value associated with the one or more verification signatures does not match the second value associated with the one or more additional verification signatures; and determining the one or more commands are invalid. In some examples, determining the one or more commands are invalid can result in (and/or include) determining that the one or more commands are unauthorized for execution by the GPU and/or determining that the one or more commands include one or more unauthorized alterations.

In some aspects, the method, apparatuses, and computer-readable medium described above can include preventing, based on the one or more commands being invalid, execution of the one or more commands at the GPU and/or completion of a current execution of the one or more commands at the GPU.

In some examples, the one or more commands specify one or more operations to be performed by the GPU, and the validity of the one or more commands is determined during a runtime execution of the one or more commands and/or a software application associated with the one or more commands.

In some cases, the first value and the second value is generated based on one or more characteristics of the one or more commands. In some examples, the one or more characteristics can include a number of commands, a number of one or more types of commands, a content of at least one command of the one or more commands, and/or one or more indirect pointers included in the one or more commands. In some cases, the one or more indirect pointers can include one or more references to one or more additional commands.

In some aspects, the one or more verification signatures and the first value can be generated by a user space device driver, a kernel space driver, and/or a processor authorized to create command streams and/or manipulate command streams. In some examples, the one or more additional verification signatures and the second value can be generated by a command processor associated with the GPU, a shader processor associated with the GPU, and/or a processor authorized to at least one of create command streams and manipulate command streams. In some cases, the validity of the one or more commands can be determined by the command processor and/or the shader processor.

In some examples, the one or more commands can include a command stream, a shader program, a command referencing the shader program, and/or one or more pointers to one or more locations in memory associated with the one or more commands.

In some cases, the validity of the one or more commands can be determined during a runtime execution of a software application associated with the one or more commands and prior to an execution of the one or more commands and/or a completion of one or more operations associated with the one or more commands.

In some cases, the one or more verification signatures can include a command and/or instruction indicating that execution of the one or more commands should be rejected when the one or more verification signatures are determined to be invalid.

In some cases, the apparatuses described above can be and/or can include a mobile phone, a smart wearable device, a portable computer, a desktop computer, a server, and/or a camera system. In some cases, the apparatuses described above can include an image sensor, a GPU, a central processing unit (CPU), and/or a display.

This summary is not intended to identify key or essential features of the claimed subject matter and is not intended to be used in isolation to determine the scope of the claimed subject matter. The subject matter should be understood by reference to appropriate portions of the entire specification of this disclosure, the drawings, and the claims.

The preceding, together with other features and embodiments, will become more apparent upon referring to the following specification, claims, and accompanying drawings.

BRIEF DESCRIPTION OF THE DRAWINGS

Illustrative examples of the present application are described in detail below with reference to the following drawing figures.

DETAILED DESCRIPTION

Figure 1:
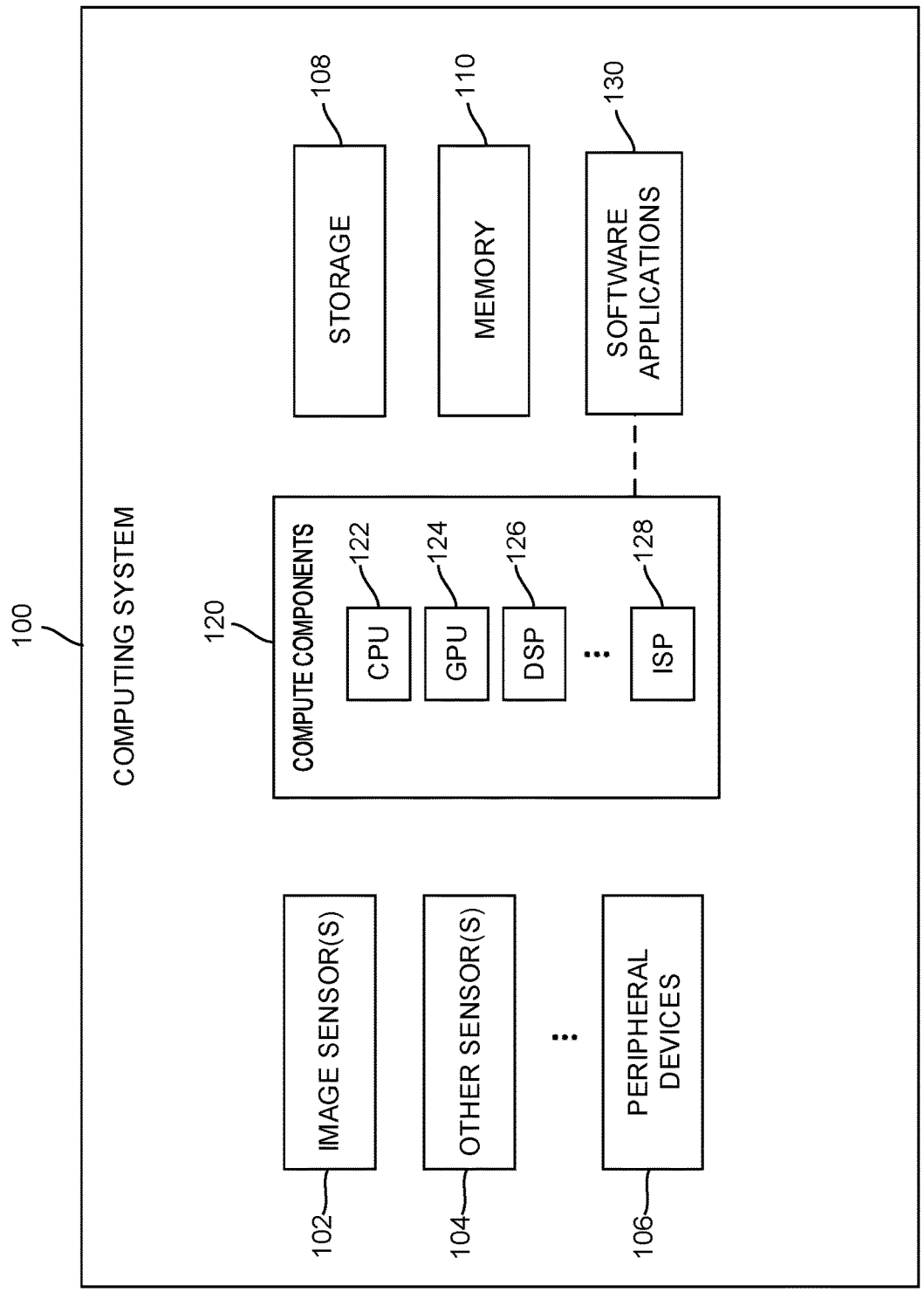
FIG. 1 is a block diagram illustrating an example image processing system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Graphics processing units (GPUs) can execute commands generated by drivers and/or other computer components (e.g., within the GPUs and/or separate from the GPUs) to perform GPU operations, such as graphics rendering operations. In some cases, drivers interacting with a GPU and commands processed by a GPU can expose certain GPU information that a user can exploit to tamper with a function of the GPU, which can negatively impact a security, stability, and/or behavior of the GPU. For example, if the GPU does not implement measures to protect the integrity of commands and/or information used by the GPU, users may be able to hack GPU operations and information, implement unauthorized drivers and/or commands, tamper with a function of the GPU, and/or otherwise alter a behavior of the GPU.

In some cases, users may be able to analyze GPU data (e.g., packets, commands, operations, etc.) and reverse engineer command streams executed by the GPU to write and implement drivers to generate commands that can be executed by the GPU. The commands can be configured to trigger GPU operations that can expose private and other information about the GPU, such as errata; alter a behavior of the GPU; cause security and/or stability issues; and/or allow users to gain unauthorized access to certain aspects of the GPU and/or its operations. In some examples, users can analyze GPU data, such as GPU packets, to reverse engineer a GPU command stream to generate GPU commands that manipulate the GPU to render private information, expose hidden or inaccessible graphics content, and/or otherwise tamper with an operation of the GPU. In some cases, users may be able to hack GPU binaries, such as shader binaries, to manipulate a behavior of the GPU.

For example, without GPU protections, a user may crawl a memory at runtime to identify patterns in commands and shaders implemented by a GPU during a video game. The user may then be able modify the patterns to control the opacity in a vertex shader. This way, the user may be able to control the GPU to change objects rendered from opaque to transparent in order to see things and/or competitors behind the rendered objects and gain an advantage during the video game.

The technologies disclosed herein can provide a mechanism to verify an integrity of commands, shader programs, and/or other instructions implemented by a GPU. For example, the technologies disclosed herein can verify that commands, shader programs, and/or other instructions implemented by a GPU have not be hacked, tampered with, or altered. The technologies disclosed herein can also reject and/or stop execution of any commands, shader programs, and/or other instructions that cannot be verified and/or are determined to have been hacked, tampered with, or altered. The technologies disclosed herein can also obfuscate, conceal, and/or protect command and/or shader program patterns to prevent others from reverse engineering and exploiting such patterns. In some examples, the technologies disclosed herein can implement signatures at arbitrary, pseudo random, or other locations in command streams, shader programs, and/or other instructions to prevent others from reverse engineering the command streams, shader programs, and/or other instructions, and verify the integrity of the command streams, shader programs, and/or other instructions.

Figure 5:
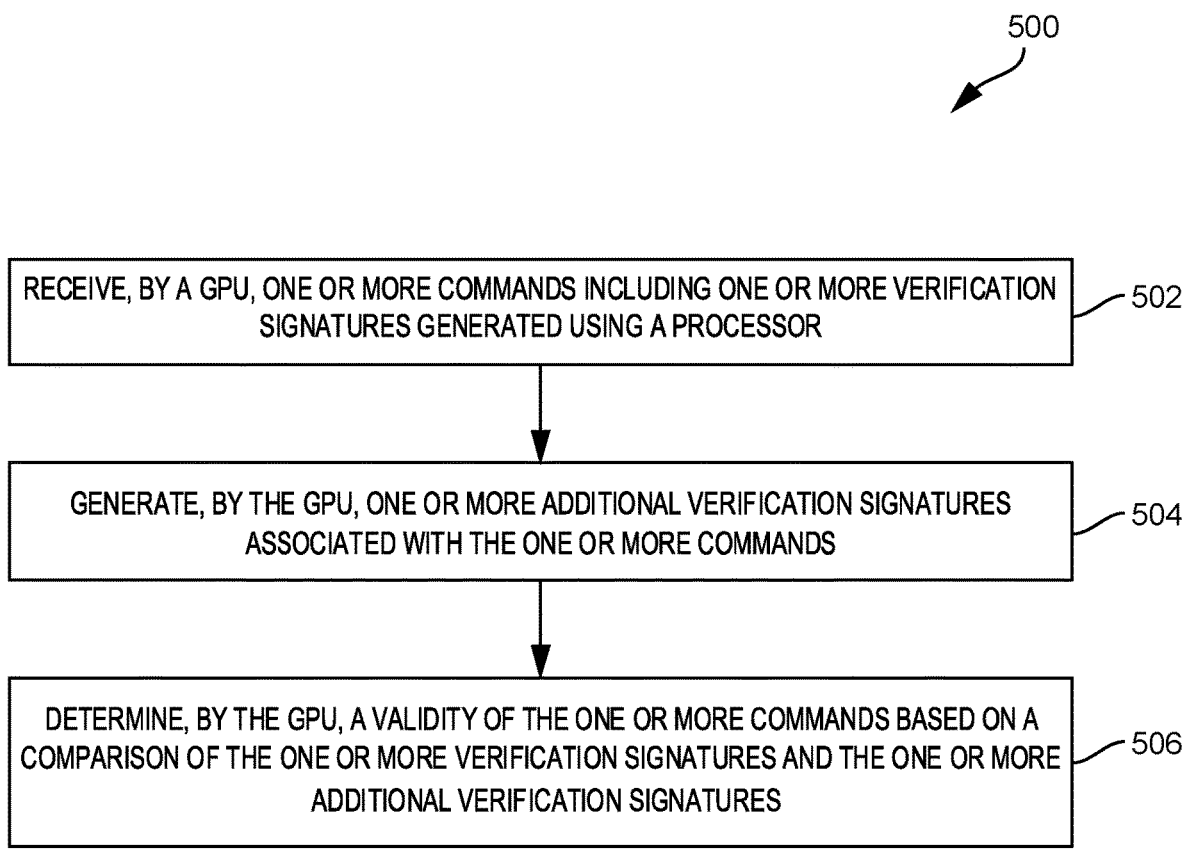
FIG. 5 is a flowchart of an example of a method for signing and executing graphics processing unit commands, in accordance with some examples of the present disclosure.
Figure 6:
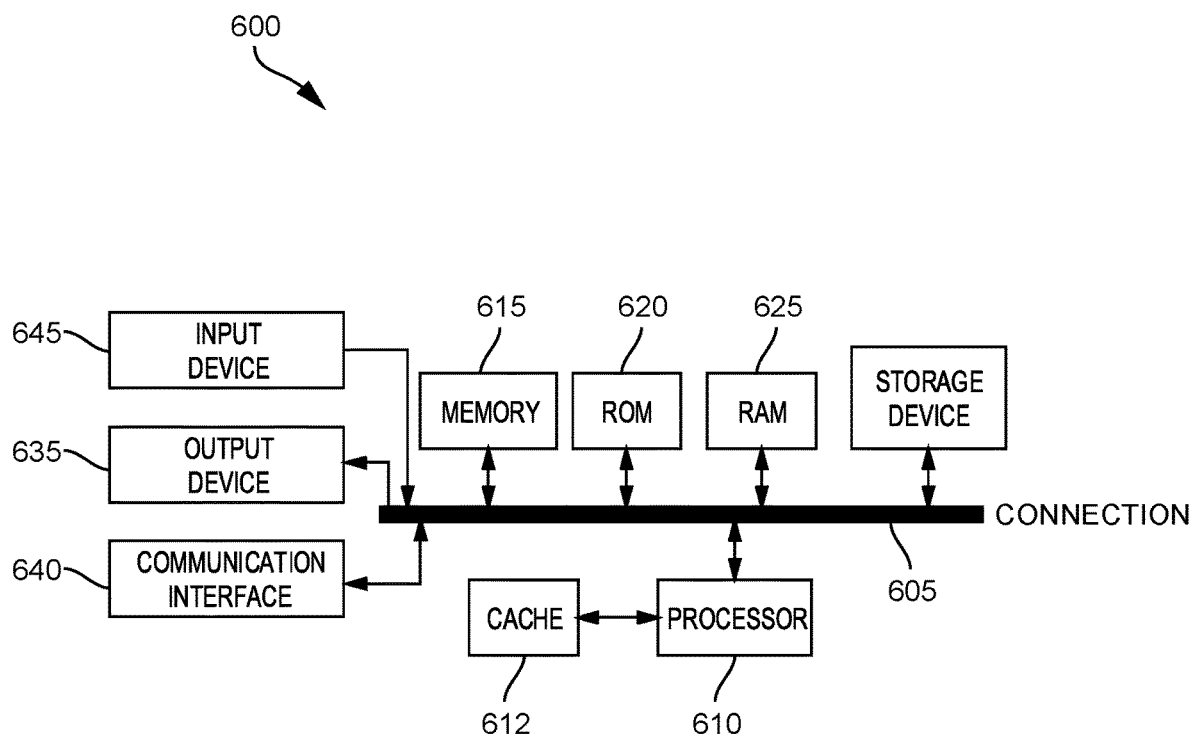
FIG. 6 illustrates an example computing device architecture, in accordance with some examples of the present disclosure.

In the following disclosure, systems, apparatuses (or devices), processes (or methods), and computer-readable media are provided for signing and executing GPU command streams and software. The present technologies will be described in the following disclosure as follows. The discussion begins with a description of example systems, technologies and techniques for signing and executing GPU command streams and software, as illustrated in FIGS. 1 through 4B. A description of an example process for signing and executing GPU command streams and shader programs, as illustrated in FIG. 5, will then follow. The discussion concludes with a description of an example computing device architecture, including example hardware components suitable for signing and executing GPU command streams and software, as illustrated in FIG. 6. The disclosure now turns to FIG. 1

FIG. 1 is a diagram illustrating an example computing system 100 that can be configured to implement one or more aspects of the present disclosure. In some examples, the computing system 100 can sign and execute processor and/or computer program commands and command streams as further described herein. For example, in some cases, the computing system 100 can sign and execute graphics processing unit (GPU) command streams to protect the command streams and prevent unauthorized reversed engineering of the command streams. In some examples, the computing system 100 can sign and execute computer graphics commands, such as shader commands. The computing system 100 can also perform any other computer processing tasks such as, for example, data processing tasks, image processing tasks, and graphics rendering and/or manipulation, among others.

The computing system 100 can be part of a computing device or multiple computing devices. In some examples, the computing system 100 can be part of an electronic device (or devices) such as a desktop computer, a laptop or notebook computer, a server, a tablet computer, a camera system (e.g., a digital camera, an IP camera, a video camera, a security camera, etc.), a telephone system (e.g., a smartphone, a cellular telephone, a conferencing system, etc.), an embedded system, a mobile phone, a game console, a display system, an extended reality (XR) device (e.g., a head-mounted display, smart glasses, etc.), or any other suitable electronic device(s).

In the example shown in FIG. 1, the computing system 100 includes one or more image sensors 102, one or more other sensors 104, one or more peripheral devices 106, a storage 108, a memory 110, and compute components 120. In some implementations, the one or more image sensors 102, the one or more other sensors 104, the one or more peripheral devices 106, the storage 108, the memory 110, and the compute components 120 can be part of the same computing device. For example, in some cases, the one or more image sensors 102, the one or more other sensors 104, the one or more peripheral devices 106, the storage 108, the memory 110, and the compute components 120 can be integrated into a smartphone, laptop, tablet computer, gaming system, XR device, server, desktop computer, and/or any other computing device. However, in some implementations, the one or more image sensors 102, the one or more other sensors 104, the one or more peripheral devices 106, the storage 108, the memory 110, and the compute components 120 can be part of two or more separate computing devices.

In some examples, the one or more image sensors 102 can include any image and/or video sensors and/or camera devices, such as a digital camera, a video camera, a smartphone camera, a camera device on an electronic apparatus such as a television or computer, a camera system, etc. In some cases, the one or more image sensors 102 can be part of a camera or computing device such as a digital camera, a video camera, an IP camera, a smartphone, a smart television, a game system, etc. In some examples, the one or more image sensors 102 can be part of a dual-camera assembly. The one or more image sensors 102 can capture image and/or video content (e.g., raw image and/or video data), which can then be processed by the compute components 120 to render, store, and/or manipulate the image and/or video content.

The one or more other sensors 104 can include any sensor for detecting and/or measuring information such as light, sound, environment conditions, objects, distance information, motion information, position information, speed, etc. Non-limiting examples of sensors include LIDARs, gyroscopes, accelerometers, magnetometers, radars, inertial measurement units (IMUs), temperature sensors, humidity sensors, sound sensors, light sensors, machine vision sensors, among others.

The one or more peripheral devices 106 can include any devices capable of receiving inputs and/or providing outputs. Non-limiting examples of peripheral devices can include displays, keyboards, pointing devices (e.g., a computer mouse, a trackpoint, a touchpad, a touchscreen, a joystick, a remote, an input tracking device, a controller, etc.), transceivers, microphones, speakers, screens, projectors, printers, scanners, network interfaces (e.g., wired and/or wireless communications interfaces and the like), among others.

The storage 108 can be any storage device(s) for storing data, such as image data, video data, files, software, folders, content items, and/or any other type of digital data. The storage 108 can store data from any of the components of the computing system 100. For example, the storage 108 can store data or measurements from any of the one or more image sensors 102, the one or more other sensors 104, the one or more peripheral devices 106, the memory 110, and the compute components 120 (e.g., processing parameters, outputs, calculation results, state, etc.). In some examples, the storage 108 can include a buffer for storing data for processing by the compute components 120.

The memory 110 can include one or more volatile memories, non-volatile memories, and/or computer-readable storage media such as, for example, random access memory (RAM), static RAM (SRAM), dynamic RAM (DRAM), read-only memory (ROM), erasable programmable ROM (EPROM), electrically erasable programmable ROM (EEPROM), flash memory, solid state memory, magnetic data media, optical storage media, among others. In some examples, the memory 110 can include system or main memory.

In some implementations, the compute components 120 can include a central processing unit (CPU) 122, a graphics processing unit (GPU) 124, a digital signal processor (DSP) 126, and/or an image signal processor (ISP) 128. In some cases, the compute components 120 can include other electronic circuits or hardware, computer software, firmware, or any combination thereof, to perform any of the various operations described herein. The compute components 120 can perform various operations such as data processing operations, computer program execution and operations, image processing operations, computer vision, graphics rendering, extended reality (XR) (e.g., augmented reality, virtual reality, mixed reality, and the like), sensor processing, computer system operations, and/or any of the various operations described herein.

In some examples, the compute components 120 can implement software applications 130 of the computing system 100. The software applications 130 can include any software application and/or computer program. For example, the software applications 130 can include a graphical user interface application, a video game application, a media application (e.g., a video playback/streaming application, an image rendering application, etc.), an XR application, a video and/or image editing application, an operating system, a virtualization system (e.g., a virtual machine, a software container, etc.), a graphics rendering application, a two-dimensional (2D) and/or three-dimensional (3D) animation and rendering application, a simulation application, a coding application (e.g., encoding, decoding), an application for scientific calculations, a modeling application, a digital content creation application, an artificial intelligence application, an image processing application, a geometric computing application, an imaging application, a computer vision application, and the like.

While the computing system 100 is shown to include certain components, one of ordinary skill will appreciate that the computing system 100 can include more or fewer components than those shown in FIG. 1. For example, the computing system 100 can also include, in some instances, cache, application specific integrated circuits (ASICs), field-programmable gate arrays (FPGAs), modems, and/or other hardware or processing devices that are not shown in FIG. 1. An illustrative example of a computing device and hardware components that can be implemented with the computing system 100 is described below with respect to FIG. 6.

Figure 2:
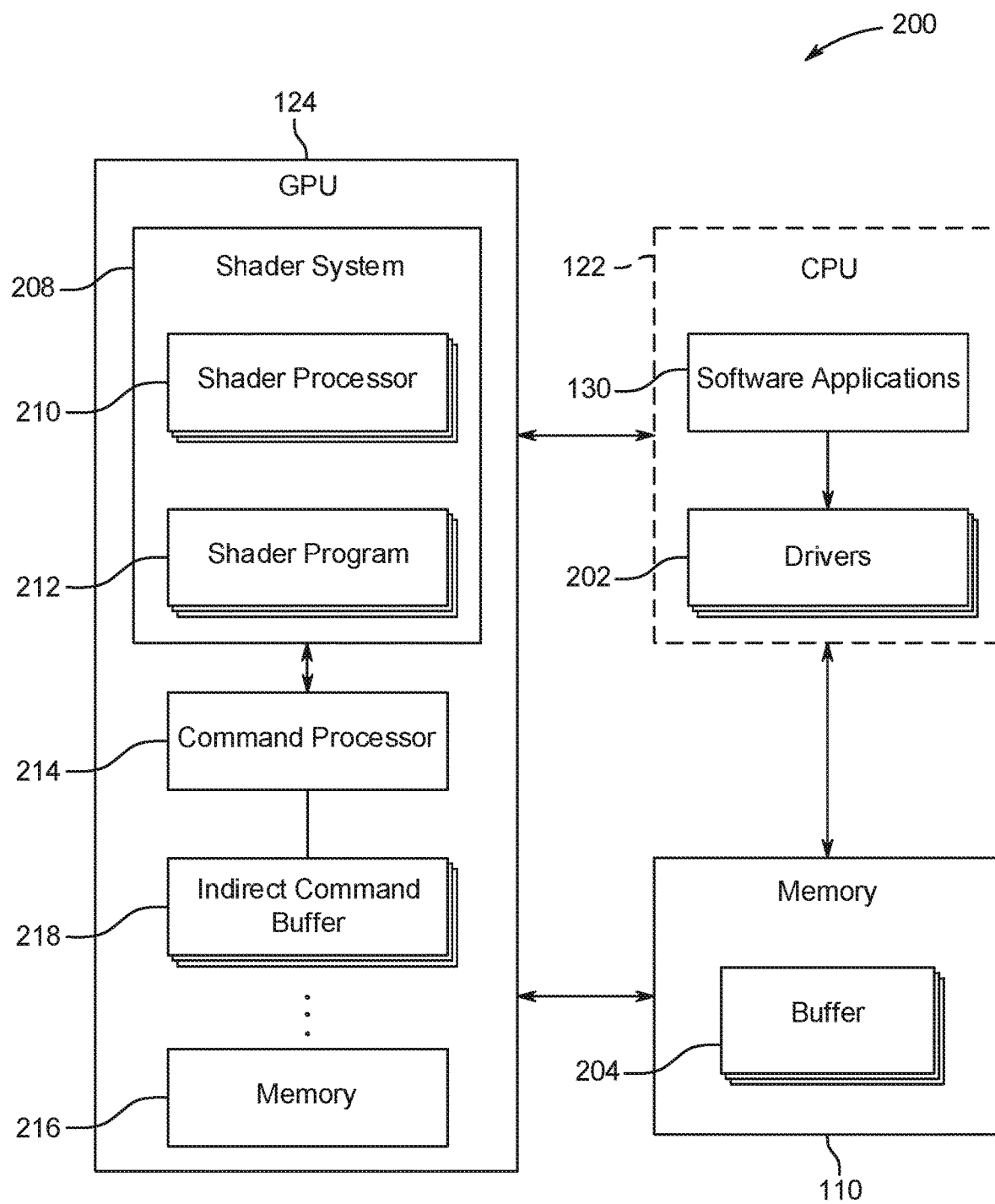
FIG. 2 is a diagram illustrating example components of a graphics rendering system, in accordance with some examples of the present disclosure.

FIG. 2 is a diagram illustrating example components of a graphics rendering system 200. In some cases, the graphics rendering system 200 can be implemented by the computing system 100. In this example, the graphics rendering system 200 includes the memory 110, the CPU 122, and the GPU 124.

CPU 122 can process instructions for execution within the computing system 100. In some examples, CPU 122 can be configured to execute software applications 130. Software applications 130 can include software applications that implement one or more functionalities of the GPU 124. In such examples, CPU 122 can be configured to execute software applications that implement one or more functionalities of GPU 124. For example, CPU 122 can be configured to execute software applications that include one or more instructions for GPU 124 to render graphics content, such as a graphical user interface, video content, image content, animations, and the like.

CPU 122 can implement drivers 202 that can generate one or more commands to implement instructions associated with the software applications 130 executed by CPU 122. In some examples, CPU 122 can use the drivers 202 to generate command streams that specify operations for GPU 124 to perform. The CPU 122 can send the command streams and/or compiled shader programs to the GPU 124, and the GPU 124 can perform the operations associated with the command streams and/or the compiled shader programs. In some examples, the CPU 122 can send (e.g., via drivers 202) instructions (e.g., compiled shader programs) to the GPU 124 for execution by one or more shader processors 210 on the GPU 124.

In some examples, the drivers 202 can implement application programming interface (API) functionalities. For example, the drivers 202 can issue API calls to the GPU 124 (and/or components thereof) and/or other components of the computing system 100. In some cases, the drivers 202 can include one or more kernel mode drivers. The one or more kernel mode drivers can execute software code in kernel mode. For example, the one or more kernel mode drivers can have complete and/or unrestricted access to the underlying hardware, can execute any CPU instruction and/or reference any memory address. In some examples, the one or more kernel mode drivers can execute lower-level functions such as, for example, initializing hardware, managing memory, managing interrupts, and the like. In some cases, the drivers 202 can also include one or more user space drivers. The one or more user space drivers can be restricted from directly accessing the underlying hardware or referencing memory. The one or more user space drivers can instead delegate to, or rely on, system APIs to access hardware or memory. In some examples, the one or more user space drivers can convert system APIs to commands to be executed.

Memory 110 can include one or more buffers 204 for storing data from CPU 122 and/or GPU 124. The one or more buffers 204 can include, for example, a command buffer, a ring buffer, and/or any other type of buffer. In some examples, the one or more buffers 204 can store one or more commands issued by the drivers 202 and/or CPU 122, one or more pointers to one or more commands (and/or to locations in memory storing the one or more commands) issued by the drivers 202 and/or CPU 122, one or more pointers to one or more indirect command buffers 218

(further described below) of commands issued by the drivers 202 and/or CPU 122, data associated with memory access operations, data associated with operations of one or more commands, and/or the like. For example, the one or more buffers 204 can store a command stream(s) specifying operations for the GPU 124 to perform (e.g., via the one or more shader processors 210 and/or command processor 214), a state of operations of a command stream(s), and/or pointers to indirect buffers or commands in memory and/or indirect buffers.

In some cases, the one or more buffers 204 can store state data (e.g., variables, intermediate results of operations, processing events, trace information, execution values, etc.) associated with operations of a command stream. In some cases, the one or more buffers 204 can allow the computing system 100 to store data (e.g., state, commands, memory access operations data, etc.) associated with a command stream(s) and/or operations of a command stream(s) for fast access by the CPU 122 and/or GPU 124, and/or avoid persisting the data in a memory on the GPU 124 (e.g., memory 216) and/or memory 110.

GPU 124 can be configured to perform graphics rendering operations and/or graphics processing operations. In some examples, GPU 124 can be configured to perform general purpose computing operations and/or other processing operations such as, for example, image processing operations. In the example shown in FIG. 2, GPU 124 includes a shader system 208, a command processor 214, and memory 216.

The shader system 208 can include one or more shader processors 210 and one or more shader programs 212 compiled by one or more of the drivers 202. The one or more shader processors 210 can perform shading operations to render graphics content. For example, one or more shader processors 210 can perform geometry, vertex, pixel, and/or other shading operations. In some cases, the one or more shader processors 210 can include one or more components for performing associated operations, logic units for performing calculations, registers, caches, memories, and the like. The one or more shader programs 212 can include shading language programs compiled by one or more of the drivers 202. In some cases, the one or more shader programs 212 can include instructions (e.g., commands, logic, etc.) for associated shading operations performed by the one or more shader processors 210.

The command processor 214 can be configured to receive and process command streams from the drivers 202. In some examples, the command processor 214 can be a stream processor configured to receive and process streams of commands from the CPU 122 (e.g., from the drivers 202). In some cases, the command processor 214 can schedule operations to be performed by the GPU 124. For example, the command processor 214 can schedule operations to be performed by the one or more shader processors 210. In some cases, the command processor 214 can determine when to schedule operations and/or which GPU resources to execute the operations. In some examples, the command processor 214 can receive a command stream from the drivers 202 and schedule operations of the command stream for execution by the one or more shader processors 210.

In some cases, the command processor 214 can receive multiple command streams from the drivers 202. In some examples, the command processor 214 can interrupt operations of a command stream during execution by the GPU 124, and initiate (e.g., start, restart, switch to, etc.) operations of a different command stream. The command processor 214 can later restart the interrupted operations of the command stream. In some examples, the command processor 214 can receive an interrupt from the drivers 202 and/or CPU 122 to switch from operations of one command stream to another command stream.

The command processor 214 can store data associated with operations of command streams. In some cases, the command processor 214 can store the data on the one or more buffers 204, the memory 110 and/or the memory 216 on the GPU 124. For example, the command processor 214 can store command streams, state associated with operations of command streams, operations data, data associated with memory access operations, and/or other data on the one or more buffers 204 and/or the memory 216. In some examples, the command processor 214 can process and/or schedule operations of commands in one or more indirect command buffers 218.

The one or more indirect command buffers 218 can include commands and/or pointers to commands in one or more command streams received by the command processor 214 from the drivers 202. For example, an indirect command buffer can include a set of pointers to commands in a command stream from the drivers 202. In some cases, the pointers can reference commands in a command stream and/or locations in memory where the commands in the command stream are stored. For example, an indirect command buffer can include a set of pointers to commands in a command stream. In some cases, each pointer can reference a location in memory (e.g., memory 216, one or more buffers 204, etc.) where the command associated with that pointer is stored and/or where a state of an operation associated with the command is stored. In some cases, the command processor 214 can cache the one or more indirect command buffers 218, retain the one or more indirect command buffers 218 while processing commands in the indirect command buffers 218, and/or store the one or more indirect command buffers 218 on memory 216.

In some cases, the one or more buffers 204 can include pointers to the one or more indirect command buffers 218, commands associated with the one or more indirect command buffers 218, and/or a state of operations associated with commands in the one or more indirect command buffers 218. In some examples, at least a portion of the data in the one or more buffers 204 can correspond to data in the one or more indirect command buffers 218. In some cases, an indirect command buffer can include a pointer to a different indirect command buffer associated with a different command stream.

For example, a first indirect command buffer can include a pointer to a second indirect command buffer associated with a second command stream to be processed as part of the first command stream. The command processor 214 can initiate and/or process the commands associated with the first command stream. During the processing of commands in the first command stream, when the command processor 214 reaches the pointer in the first indirect command buffer to the second indirect command buffer, the command processor 214 can process the second command stream in the second indirect buffer associated with that pointer. When the operations of the second command stream are complete, the command processor 214 can return to the first indirect buffer and process any remaining pointers (and/or associated commands).

To further illustrate, in an example, a the first command stream may correspond to commands for drawing a car to render, and the second command stream may correspond to commands for drawing the wheels of the car. In this example, the command processor 214 can sequentially access pointers and/or commands in the first indirect command buffer to initiate operations of the first command stream for drawing the car. When the command processor 214 encounters a pointer to the second indirect command buffer, the command processor 214 can sequentially access pointers and/or commands in the second indirect command buffer to initiate operations of the second command stream for drawing the wheels of the car. When the operations of the second command stream are complete, the command processor 214 can return to the first indirect command buffer to sequentially access any remaining pointers and/or commands and initiate any remaining operations for drawing the car.

In some cases, command processor 214 can store data associated with operations of a command stream as command processor 214 processes the command stream. For example, command processor 214 can buffer data (e.g., state, commands, memory access operations data, etc.) associated with memory access operations (e.g., read operations, write operations, and the like) and/or data associated with operations that depend on data in certain memory locations. In some cases, this can provide the GPU 124 fast access to the buffered data, allow the GPU 124 to avoid generating the same data more than once, and/or allow the GPU 124 to avoid persisting the data in memory 216 on the GPU 124 and/or memory 110.

In some examples, operations in a command stream can access one or more locations in memory 216, memory 110, and/or one or more buffers 204. In some cases, data associated with the operations can include an indication of the contents of the one or more locations in memory 216, memory 110, and/or one or more buffers 204 associated with the operations.

The memory 216 can include any graphics memory. In some examples, the memory 216 can include one or more volatile memories, non-volatile memories, and/or computer-readable storage media such as, for example, random access memory (RAM), static RAM (SRAM), dynamic RANI (DRAM), erasable programmable ROM (EPROM), electrically erasable programmable ROM (EEPROM), flash memory, and/or the like.

Figure 3:
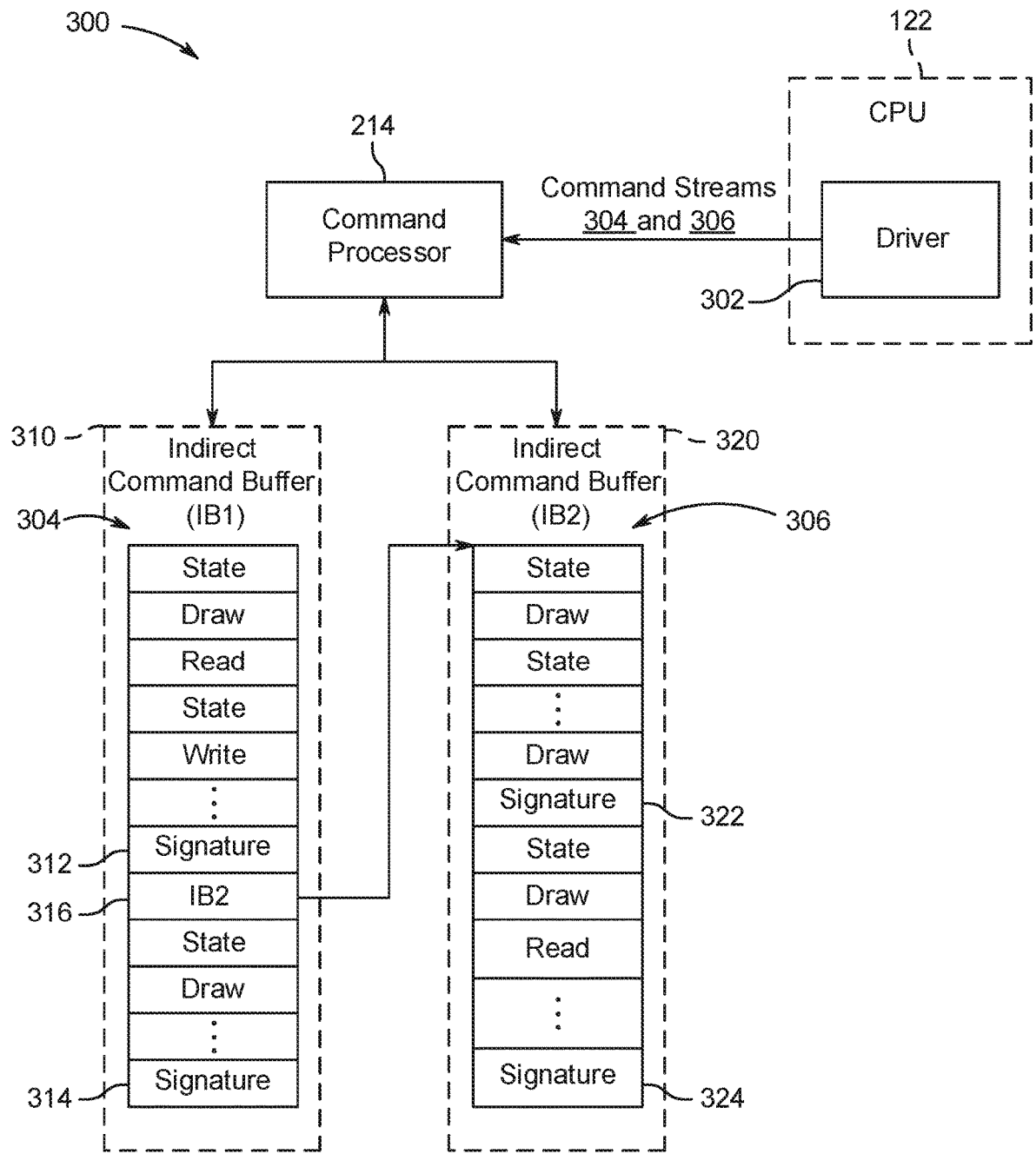
FIG. 3 is a diagram illustrating an example system flow for implementing signed command streams, in accordance with some examples of the present disclosure.

FIG. 3 is a diagram illustrating an example system flow 300 for implementing signed command streams. In this example, the driver 302 can represent a driver from the drivers 202 in FIG. 2. The driver 302 can be associated with a software application from the software applications 130.

The driver 302 can generate and send command streams 304 and 306 to command processor 214. The command streams 304 and 306 can include commands specifying operations for the GPU 124 and/or command processor 214 to perform. In FIG. 3, the command stream 304 represents a command stream sent to the command processor 214 and included in indirect command buffer (ICB) 310, and command stream 306 represents a command stream sent to the command processor 214 and included in ICB 320. While FIG. 3 illustrates two command streams and two ICBs, it should be noted that other examples can include a single command stream and/or ICB, or more than two command streams and/or ICBs. The command streams 304 and 306 and the ICBs 310 and 320 are non-limiting examples provided for explanation purposes.

In some examples, commands in the commands in streams 304-306 and/or ICBs 310-320 can be encapsulated in packets. For example, a command can be the payload (or a portion of the payload) of a packet in a command stream and/or corresponding ICB. In some cases, the packet can have a particular structure defined by a programming model used. For example, the packet can have a header and a payload as defined by a particular programming model.

ICB 310 and ICB 320 can represent indirect command buffers from the one or more indirect command buffers 218 in FIG. 2. ICB 310 can include commands (or pointers to commands) in the command stream 304, and ICB 320 can include commands (or pointers to commands) in the command stream 306. In the example in FIG. 3, ICB 310 also includes an indirect pointer 316 that references (e.g., points to) ICB 320. The indirect pointer 316 can reference ICB 320 to indicate that, when the command processor 214 reaches the indirect pointer 316 as the command processor 214 sequentially processes the command stream 304 in the ICB 310, the command processor 214 should access and process the command stream 306 in ICB 320. In other words, the indirect pointer 316 can function similar to a symbolic link to direct the command processor 214 to the ICB 320 when it reaches the indirect pointer 316.

In this way, the indirect pointer 316 can redirect the command processor 214 to the command stream 306 in ICB 320 when the command processor 214 reaches the indirect pointer 316 within the ICB 310. Based on the indirect pointer 316, the command processor 214 can access the ICB 320 and process the command stream 306 in the ICB 320. When the command processor 214 completes processing the command stream 306 in the ICB 320, the command processor 214 can return to the ICB 310 and continue with the next command or pointer (if any) after the indirect pointer 316, which in the example of FIG. 3 is a state command.

The command streams 304 and 306 can include signatures 312, 314, 322, and 324 generated by the driver 302. For example, command stream 304 can include signatures 312 and 314 at different locations within the command stream 304, and command stream 306 can include signatures 322 and 324 at different locations within the command stream 306. The number of signatures shown in FIG. 3 are illustrative examples provided for explanation purposes. In other examples, the command streams 304 and/or 306 can include more or less signatures than shown in FIG. 3.

The signatures 312, 314, 322, and 324 can include hash values generated using a hashing algorithm. The driver 302 and the command processor 214 can know the hashing algorithm and keys used to generate the signatures 312, 314, 322, and 324, to allow the driver 302 and command processor 214 to independently generate and verify the signatures 312, 314, 322, and 322. In some cases, other components of the GPU 124, such as the one or more shader processors 210, can also know the hashing algorithm and keys used to generate the signatures 312, 314, 322, and 324 to independently generate and verify the signatures 312, 314, 322, and 324. The signatures 312, 314, 322, 324 can provide a security mechanism for protecting the integrity of the command streams 304 and 306 and the operation of the GPU 124. For example, the signatures 312, 314, 322, 324 can provide a level of encryption, verification, and/or obfuscation to prevent others from reverse engineering and/or manipulating the command streams implemented by the GPU 124 and associated software.

In some examples, the signatures 312, 314, 322, 324 can include a no-operation instruction or other instruction or command indicating that the command streams 304 and 306 should not be executed and/or accepted if the signatures 312, 314, 322, 324 are not verified by the command processor 214.

In some examples, the driver 302 can generate the signatures 312, 314, 322, and 324, and the command processor 214 can verify the signatures 312, 314, 322, and 324 when receiving, storing, processing, scheduling, and/or executing the command streams 304 and 306. For example, the command processor 214 can use the same hashing algorithm to generate signatures based on the command streams 304 and 306 received from the driver 302. The command processor 214 can then compare the generated signatures with the signatures 312, 314, 322, and 324 to verify that the command streams 304 and 306 have not been manipulated (e.g., tampered with, damaged, altered, hacked, etc.).

If the command processor 214 fails to verify the signatures 312, 314, 322, 324 (e.g., if the generated signatures do not match the signatures 312, 314, 322, 324), the command processor 214 can reject (e.g., abort, decline, ignore, refuse to process/execute, etc.) the command streams 304 and 306. In some examples, if the command processor 214 fails to verify the signatures 312, 314, 322, 324, the command processor 214 can generate a fault (e.g., an error, an alert, a notification, a failure event, etc.) that prevents the command streams 304 and 306 from being executed (and/or stops execution of the command streams 304 and 306) and/or indicates that verification of the signatures 312, 314, 322, 324 has failed. In some cases, the command processor 214 can generate an indication, alert, notification, etc., to inform the driver 302, the computing system 100, and/or a user that a signature verification has failed, which can indicate a potential problem and/or malicious act. If the command processor 214 is able to verify the signatures 312, 314, 322, 324 (e.g., if the generated signatures match the signatures 312, 314, 322, 324), the command processor 214 can allow the command streams 304 and 306 to be executed and/or to continue to be executed.

The driver 302 (and the command processor 214 when verifying) can generate hash values for the signatures 312, 314, 322, and 324 based on one or more characteristics of the command streams 304 and 306. For example, the driver 302 can generate a signature for a command stream based on a size of the command stream (e.g., a number of commands or packets in the command stream), a number of indirect pointers in the command stream, one or more portions of the contents of the command stream, a number of commands of a certain type (e.g., a number of draw commands, a number of state commands, a number of read commands, etc.), a number of groups of commands of a certain type (e.g., a number of groups of draw, state and/or other commands), contents of one or more commands in the command stream (e.g., contents of draw and/or state commands, contents of every third command, etc.), and/or any other characteristic of the command stream.

To illustrate, the driver 302 can track the number, type, pattern, characteristics and/or contents of the commands (or a portion of the commands) it encounters as it generates the command stream 304. When the driver 302 generates signature 312, the driver 302 can know the number, type, pattern, characteristics, and/or contents of commands (or of certain tracked commands) that the driver 302 has encountered in the command stream 304 before the signature 312. The driver 302 can use any information from the number, type, pattern, characteristics, and/or contents of the commands it has encountered to generate the signature 312. After generating the signature 312, the driver 302 can continue to track the number, type, pattern, characteristics, and/or contents of commands in the command stream 304. When generating the signature 314, the driver 302 can similarly use the tracked information to calculate the signature 314. The signature 314 can be generated based on information tracked before the signature (e.g., including or excluding information tracked before the signature 312).

The driver 302 can similarly generate the signatures 322 and 324 for command stream 306. In some cases, since command stream 306 is referenced by command stream 304 (e.g., via indirect pointer 316), when generating the signatures 322 and 324 for command stream 306, the driver 302 can optionally take into account (e.g., use in calculating the signatures 322 and 324) information tracked from command stream 304, and/or vice versa.

In some examples, the driver 302 can insert a signature in a command stream at one or more random, pseudo random, and/or predetermined locations. For example, the driver 302 can insert a signature in a command stream after every n number of commands in the command stream, after every n kilobytes of data and/or space, after every n number of a certain type of command(s), at one or more arbitrarily selected locations, at one or more locations calculated as a factor of one or more characteristics of the command stream and/or a portion of contents in the command stream (e.g., as a factor of one or more payloads in the command stream, a size of the command stream, a pattern of commands in the command stream, etc.), at one or more locations calculated as a factor of one or more runtime conditions, and/or any other characteristics for calculating locations with a level of randomness.

By randomizing, obscuring, and/or hiding the locations of signatures in a command stream, the driver 302 can prevent (or increase the difficulty of) others reverse engineering the signatures and/or the command stream based on patterns in the signatures and/or the command stream. For example, if a malicious user analyzes command streams and detects that a signature is inserted at the same location in command streams, the malicious user may be able to identify certain patterns about the signature and the command streams and reverse engineer the signature based on the identified patterns. The malicious user could potentially reverse engineer the command streams, hack (e.g., alter, tamper, copy, damage, etc.) the command streams, hack the operation of the GPU 124, and/or use the information (e.g., the command stream and/or signature information) for unauthorized and/or malicious actions.

Figure 4A:
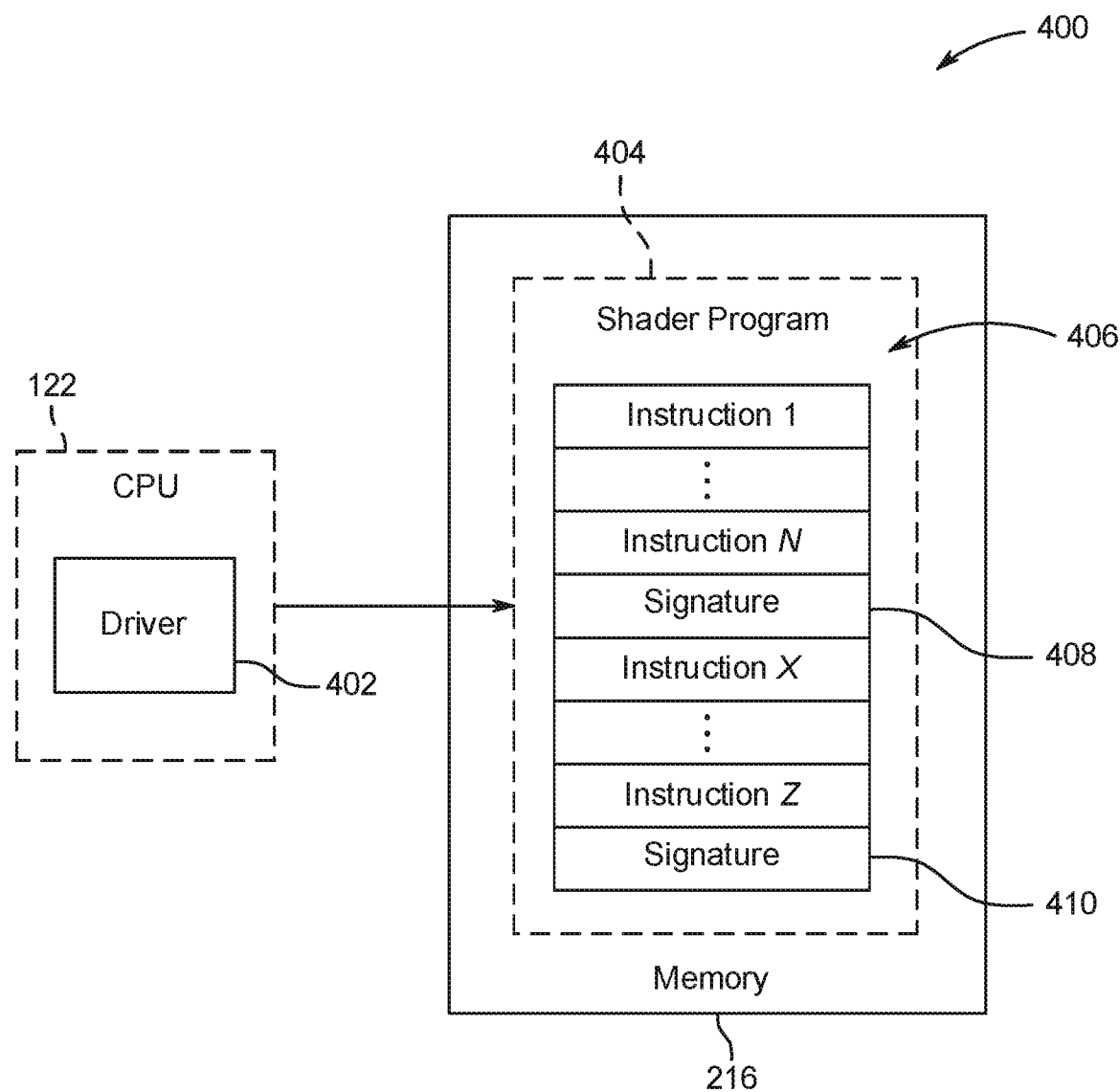
FIG. 4A is a diagram illustrating an example system flow for compiling a shader program with verification signatures, in accordance with some examples of the present disclosure.

FIG. 4A is a diagram illustrating an example system flow 400 for compiling a shader program with verification signatures. In this example, the driver 402 can compile shader program 404 for execution by a shader processor (e.g., one or more shader processors 210). In some examples, the shader program 404 can be stored in memory 216 for retrieval and execution by the shader processor. In other examples, the shader program 404 can be stored in a different memory or buffer such as memory 110 or one or more buffers 204, for example.

The driver 402 can represent a driver from the drivers 202 in FIG. 2, and the shader program 404 can represent a shader program from the one or more shader programs 212 in FIG. 2. The driver 402 can be associated with a software application from the software applications 130. The shader program 404 can include a shader command stream and/or a shader instruction set specifying operations for the GPU 124 and/or a shader processor to perform. In some cases, the shader program 404 can include a set of instructions for a shader processor. In some examples, the set of instructions can include a command stream. For example, each instruction in the set of instructions can include a command, such as a shader command.

The shader program 404 can include signatures 408 and 410 generated by the driver 402. For example, shader program 404 can include signatures 408 and 410 at different locations within the shader program 404. The number of signatures shown in FIG. 4A are illustrative examples provided for explanation purposes. In other examples, the shader program 404 can include more or less signatures than shown in FIG. 4A.

The signatures 408 and 410 can include hash values generated using a hashing algorithm. The signatures 408 and 410 can provide a security mechanism for protecting the integrity of the shader program 404 and the operation of the GPU 124. For example, the signatures 408 and 410 can provide a level of encryption, verification, and/or obfuscation to prevent others from reverse engineering and/or manipulating the shader program 404.

In some examples, the driver 402 can generate the signatures 408 and 410, and the command processor 214 and/or the shader processor can verify the signatures 408 and 410 when receiving, storing, processing, scheduling, and/or executing the shader program 404. For example, the command processor 214 and/or the shader processor 210 can use the same hashing algorithm to generate signatures based on the shader program 404. The command processor 214 and/or the shader processor 210 can then compare the generated signatures with the signatures 408 and 410 to verify that the shader program 404 has not been manipulated (e.g., tampered with, damaged, altered, hacked, etc.). If the command processor 214 and/or the shader processor 210 fail to verify the signatures 408 and 410 (e.g., if the generated signatures do not match the signatures 408 and 410), the command processor 214 and/or the shader processor 210 can reject (e.g., abort, decline, ignore, refuse to execute, etc.) the shader program 404.

In some examples, the signatures 408 and 410 can include a no-operation instruction or other instruction or command indicating that the shader program 404 should not be executed and/or accepted if the signatures 408 and 410 are not verified by the shader processor 210 and/or the command processor 214.

The driver 402 (and the command processor 214 and/or the shader processor when verifying) can generate hash values for the signatures 408 and 410 based on one or more characteristics of the shader program 404. For example, the driver 402 can generate a signature for the shader program 404 (and/or one or more instructions and/or commands in the shader program 404) based on a size of the shader program 404 (e.g., a number of instructions and/or commands in the shader program 404), a number of indirect pointers in the shader program 404, one or more portions of the contents of the shader program 404, a number of commands of a certain type (e.g., draw, state, read, write, etc.), a number of groups of commands of a certain type (e.g., draw, state, etc.), contents of one or more instructions and/or commands in the shader program 404, and/or any other characteristic of the shader program 404.

To illustrate, the driver 402 can track the number, type, pattern, characteristics and/or contents of the commands (or a portion of the commands) it encounters as it generates the shader program 404. When the driver 402 generates signature 408, the driver 402 can know the number, type, pattern, characteristics, and/or contents of commands (or of certain tracked commands) that the driver 402 has encountered in the shader program 404 before the signature 408. The driver 402 can use any information from the number, type, pattern, characteristics, and/or contents of the commands it has encountered to generate the signature 408. After generating the signature 408, the driver 402 can continue to track the number, type, pattern, characteristics, and/or contents of commands in the shader program 404. When generating the signature 410, the driver 402 can similarly use the tracked information to calculate the signature 410. The signature 410 can be generated based on information tracked before the signature 410 (e.g., including or excluding information tracked before the signature 408).

In some examples, the driver 402 can insert a signature in the shader program 404 at one or more random, pseudo random, and/or predetermined locations. For example, the driver 402 can insert a signature in the shader program 404 after every n number of commands in the shader program 404, after every n kilobytes of data and/or space, after every n number of a certain type of command(s), at one or more arbitrarily selected locations, at one or more locations calculated as a factor of one or more characteristics of the shader program 404 and/or a portion of contents in the shader program 404 (e.g., as a factor of one or more commands in the shader program 404, a size of the shader program 404, a pattern of commands in the shader program 404, etc.), at one or more locations calculated as a factor of one or more runtime conditions, and/or any other characteristics for calculating locations with a level of randomness.

By randomizing, obscuring, and/or hiding the locations of signatures in the shader program 404, the driver 402 can prevent (or increase the difficulty of) others reverse engineering the signatures and/or the shader program 404 based on patterns in the signatures and/or the shader program 404. For example, if a malicious user detects that a signature is inserted at the same location in shader programs, the malicious user may be able to identify certain patterns about the signature and the shader program 404 and reverse engineer the signature based on the identified patterns. The malicious user could potentially reverse engineer the shader program 404, hack (e.g., alter, tamper, copy, damage, etc.) the shader program 404, hack the operation of the GPU 124, and/or use the information (e.g., the shader program 404 and/or signature information) for unauthorized and/or malicious actions.

Figure 4B:
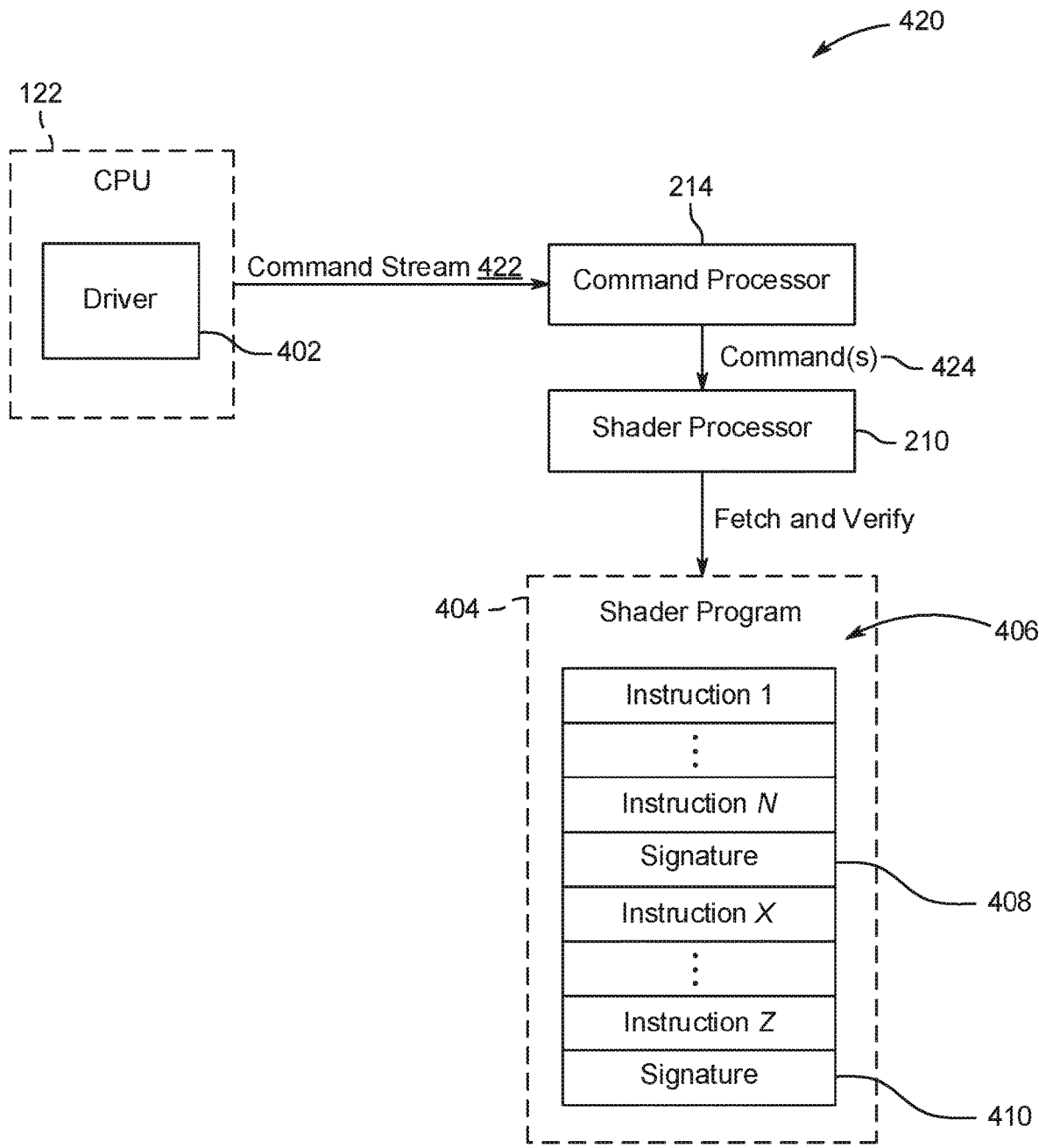
FIG. 4B is a diagram illustrating an example system flow for verifying a shader program based on verification signatures, in accordance with some examples of the present disclosure.

FIG. 4B is a diagram illustrating an example system flow 420 for verifying a shader program based on verification signatures. In this example, the driver 402 sends a command stream 422 to command processor 214. The command stream 422 can include a command instructing the command processor 214 to schedule an execution of the shader program 404 (e.g., and/or instruct the shader processor 210 to execute the shader program 404). In some examples, the command stream 422 can include a no-operation instruction or other instruction or command indicating that the shader program 404 should not be executed if the signatures 408 and 410 in the shader program 404 are not verified by the command processor 214 and/or the shader processor 210.

The command processor 214 can send a command 424 to shader processor 210 to trigger the shader processor 210 to execute the shader program 404. In some cases, the command 424 can include a no-operation instruction or other instruction or command as previously described. In some examples, the command 424 can include a pointer to a location in memory (e.g., memory 216) corresponding to the shader program 404 (e.g., where shader program 404 is stored in memory). The shader processor 210 can fetch the shader program 404 from memory and verify the signatures 408 and 410, as further described below. In some cases, prior to sending the command 424 to shader processor 210, the command processor 214 can verify the signatures 408 and 410 in the shader program 404, as described below with respect to shader processor 210.

To verify the signatures 408 and 410, the shader processor 210 (and optionally the command processor 214) can use the hashing algorithm used by the driver 402 to generate signatures based on the shader program 404. The shader processor 210 (and optionally the command processor 214) can generate the signatures based on one or more characteristics of the shader program 404 (and/or contents thereof) as previously described. The shader processor 210 (and optionally the command processor 214) can then compare the generated signatures with the signatures 408 and 410 in the shader program 404, to verify that the shader program 404 has not been manipulated (e.g., tampered with, damaged, altered, hacked, etc.).

If the shader processor 210 (or the command processor 214) fails to verify the signatures 408 and 410 (e.g., if the generated signatures do not match the signatures 408 and 410), the shader processor 210 (or the command processor 214) can reject (e.g., abort, decline, ignore, refuse to execute, etc.) the shader program 404. In some cases, the shader processor 210 (or the command processor 214) can generate an indication, alert, notification, etc., to inform the driver 402, the computing system 100, and/or a user that a signature verification has failed, which can indicate a potential problem and/or malicious act. If the shader processor 210 (and optionally the command processor 214) is able to verify the signatures 408 and 410 (e.g., if the generated signatures match the signatures 408 and 410), the shader processor 210 (and the command processor 214) can allow execution of the shader program 404 to start, continue, and/or complete.

Having disclosed example systems, technologies, and concepts, the disclosure now turns to the example method 500 shown in FIG. 5. The steps outlined herein are examples and can be implemented in any combination thereof, including combinations that exclude, add, or modify certain steps.

At block 502, the method 500 can include receiving, by a GPU (e.g., GPU 124), one or more commands (e.g., command stream 304, command stream 306, command stream 422, command 424) including one or more verification signatures (e.g., signatures 312, 314, 322, 324, 408, 410) generated using a processor (e.g., CPU 122). In some examples, each verification signature can include a first value generated based on the one or more commands. In some cases, the first value can include a hash value generated based on a hashing algorithm.

In some cases, the first value can be generated based on one or more characteristics of the one or more commands. The one or more characteristics can include, for example and without limitation, a number of commands in the one or more commands, a number of one or more types of commands in the one or more commands, a content of at least one command of the one or more commands, a content of one or more indirect pointers included in the one or more commands (e.g., indirect pointer 316), and/or a number of indirect pointers (e.g., indirect pointer 316) included in the one or more commands. In some examples, an indirect pointer can include one or more references to one or more additional commands.

In some examples, the one or more commands can specify one or more operations to be performed by the GPU (and/or one or more components of the GPU). For example, the one or more commands can specify one or more shading and/or rendering operations to be performed by the GPU. In some examples, the one or more commands can include a command stream (e.g., command stream 304, 306, 422), a shader program (e.g., shader program 404), a command (e.g., command 424) referencing the shader program, and/or one or more pointers to one or more locations in memory associated with the one or more commands.

In some examples, the one or more verification signatures can include a no-operation instruction or command indicating that the one or more commands should not be executed and/or accepted if the one or more verification signatures are not verified by the GPU (e.g., via a command processor, a shader processor, and/or a processor authorized to at least one of create command streams and manipulate command streams). For example, in some cases, the one or more verification signatures can include a command and/or an instruction (e.g., a no-operation instruction or other instruction or command) indicating that the one or more commands should not be executed and/or should be terminated if the one or more verification signatures are not valid (and/or are not verified to be valid). In some examples, the one or more commands can include a command stream including a plurality of commands.

In some cases, the one or more verification signatures can be generated by a user space device driver, a kernel space driver, and/or and a processor authorized to create command streams and/or manipulate command streams. A kernel space driver can include a kernel driver and/or a driver operating in kernel mode. In some examples, a kernel space driver can execute software code in kernel mode and/or kernel space. For example, a kernel space driver can have complete and/or unrestricted access to the underlying hardware (e.g., the GPU, a memory, a processor, etc.), can execute any processor instruction (e.g., any CPU instruction) and/or reference any memory address. In some examples, a kernel space driver can execute lower-level functions such as, for example, initializing hardware, managing memory, managing interrupts, and the like.

A user space driver can include a driver operating in user space and/or user space mode. In some examples, a user space driver can be restricted from directly accessing underlying hardware or referencing memory. For example, the user space driver can instead delegate to, or rely on, system APIs to access hardware or memory. In some examples, the user space driver can convert system APIs to commands to be executed.

At block 504, the method 500 can include generating, by the GPU, one or more additional verification signatures associated with the one or more commands. In some examples, each verification signature can include a second value generated by the GPU based on the one or more commands. In some cases, the second value can be generated based on one or more characteristics of the one or more commands, as previously described. In some examples, the second value can include a hash value generated based on a hashing algorithm. For example, the second value can include a hash value generated by hashing data corresponding to (e.g., identifying, describing, representing, etc.) the one or more characteristics of the one or more commands.

In some examples, the one or more additional verification signatures can be generated by a command processor (e.g., command processor 214) associated with the GPU and/or a shader processor (e.g., shader processor 210) associated with the GPU.

At block 506, the method 500 can include determining, by the GPU, a validity of the one or more commands based on a comparison of the one or more verification signatures and the one or more additional verification signatures. In some cases, the validity of the one or more commands can be determined during a runtime execution of the one or more commands and/or a software application associated with the one or more commands.

In some cases, the validity of the one or more commands can be determined during a runtime execution of a software application associated with the one or more commands and prior to an execution of the one or more commands and/or a completion of one or more operations associated with the one or more commands.

In some examples, determining the validity of the one or more commands can include determining that a first value associated with the one or more verification signatures matches a second value associated with the one or more additional verification signatures, and determining the one or more commands are valid. The one or more commands can be determined to be valid based on the first value associated with the one or more verification signatures matching the second value associated with the one or more additional verification signatures. In some aspects, the method 500 can include authorizing, based on the one or more commands being valid, execution (e.g., initiation of an execution, completion of an execution, etc.) of the one or more commands at the GPU.

In some cases, determining the one or more commands are valid can result in determining that the one or more commands are authorized for execution by the GPU, determining an integrity of the one or more commands, and/or determining that the one or more commands do not include unauthorized alterations. In some examples, a command can be authorized for execution by the GPU if the command is determined to be (or to match a command) generated by a manufacturer of the GPU (or an entity authorized to generate commands for execution at the GPU), approved or pre-approved by a manufacturer of the GPU (or an entity authorized to generate commands for execution at the GPU), compliant with one or more authorization requirements (e.g., security requirements, stability requirements, verification requirements, developer requirements, source requirements, etc.), generated by and/or obtained from a certain approved source, etc.

In some examples, an integrity of a command can correspond to a trust level of a source of the command (e.g., a developer, the GPU manufacturer, etc.), a reliability and/or security level and/or state of the command, an assurance that the command has not been altered (e.g., damaged, tampered with, hacked, etc.), etc. In some examples, an unauthorized alteration to a command can include an alteration or hack made by an end user or an unauthorized user (and/or an unauthorized entity), a modification caused by damage and/or corruption of the command, an unexpected modification to the command, etc.

In some cases, determining the validity of the one or more commands can include determining that a first value associated with the one or more verification signatures does not match a second value associated with the one or more additional verification signatures, and determining the one or more commands are invalid. In some examples, determining the one or more commands are invalid can result in determining that the one or more commands are unauthorized for execution by the GPU and/or determining that the one or more commands include one or more unauthorized alterations.

In some aspects, the method 500 can include preventing, based on the one or more commands being invalid, execution of the one or more commands at the GPU and/or completion of a current execution of the one or more commands at the GPU. For example, when the one or more commands are determined to be invalid, the method 500 can prevent the one or more commands from being executed, reject the one or more commands, or terminate an execution of the one or more commands.

In some examples, the validity of the one or more commands can be determined by a command processor and/or a shader processor. In some examples, the one or more additional verification signatures can be generated by the command processor and/or the shader processor.

In some examples, the method 500 may be performed by one or more computing devices or apparatuses. In one illustrative example, the method 500 can be performed by the computing system 100 shown in FIG. 1 and/or one or more computing devices with the computing device architecture 600 shown in FIG. 6. In some cases, such a computing device or apparatus may include a processor, microprocessor, microcomputer, or other component of a device that is configured to carry out the steps of the method 500. In some examples, such computing device or apparatus may include one or more sensors configured to capture image data. For example, the computing device can include a smartphone, a head-mounted display, a mobile device, a camera, a tablet computer, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The method 500 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the method 500 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 6 illustrates an example computing device architecture 600 of an example computing device which can implement various techniques described herein. For example, the computing device architecture 600 can implement at least some portions of the computing system 100 shown in FIG. 1. The components of the computing device architecture 600 are shown in electrical communication with each other using a connection 605, such as a bus. The example computing device architecture 600 includes a processing unit (CPU or processor) 610 and a computing device connection 605 that couples various computing device components including the computing device memory 615, such as read only memory (ROM) 620 and random access memory (RAM) 625, to the processor 610.

The computing device architecture 600 can include a cache of high-speed memory connected directly with, in close proximity to, or integrated as part of the processor 610. The computing device architecture 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other computing device memory 615 may be available for use as well. The memory 615 can include multiple different types of memory with different performance characteristics.

The processor 610 can include any general purpose processor and hardware and/or a software service and/or component stored in storage device 630, configured to control the processor 610 as well as a special-purpose processor where software instructions are incorporated into the processor design. The processor 610 may be a self-contained system, containing multiple cores or processors, a bus, memory controller, cache, etc. A multi-core processor may be symmetric or asymmetric.

To enable user interaction with the computing device architecture 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art, such as a display, projector, television, speaker device. In some instances, multimodal computing devices can enable a user to provide multiple types of input to communicate with the computing device architecture 600. The communication interface 640 can generally govern and manage the user input and computing device output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 165, read only memory (ROM) 620, and hybrids thereof. The storage device 630 can include software, firmware, and/or logic for controlling the processor 610. Other hardware or software modules are contemplated. The storage device 630 can be connected to the computing device connection 605. In one aspect, a hardware module that performs a particular function can include the software component stored in a computer-readable medium in connection with the necessary hardware components, such as the processor 610, connection 605, output device 635, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method comprising:
receiving, by a graphics processing unit (GPU), a first plurality of commands stored in a command buffer;
receiving, by the GPU, a first verification signature stored in a first location within the command buffer between a first command and a second command, the first verification signature comprising a first value for verifying integrity of at least the first plurality of commands, wherein the first value is generated based on the first plurality of commands, and wherein the first location of the first verification signature within the command buffer is calculated as a function of one or more characteristics of the first plurality of commands to obscure the first location from being identified;
generating, by the GPU, a second verification signature associated with the first plurality of commands, the second verification signature comprising a second value generated by the GPU based on the first plurality of commands;
determining, by the GPU, a validity of at least the first plurality of commands based on a comparison of the first value of the first verification signature and the second value of the second verification signature;
executing the first plurality of commands to perform a first plurality of operations based on determining the validity of at least the first plurality of commands;
receiving, by the GPU, a second plurality of commands stored in the command buffer, the second plurality of commands sequentially following the first plurality of commands in the command buffer;
receiving, by the GPU, a third verification signature stored within a second location of the command buffer, the third verification signature comprising a third value for verifying integrity of at least the second plurality of commands, wherein the third value is generated based on the second plurality of commands, and wherein the second location of the third verification signature within the command buffer is calculated as a function of one or more characteristics of the second plurality of commands to obscure the second location from being identified;
generating, by the GPU, a fourth verification signature associated with the second plurality of commands, the second verification signature comprising a fourth value generated by the GPU based on the second plurality of commands;
determining, by the GPU, a validity of at least the second plurality of commands based on a comparison of the third value of the third verification signature and the fourth value of the fourth verification signature; and
executing the second plurality of commands to perform a second plurality of operations based on determining the validity of at least the second plurality of commands.

2. The method of claim 1, wherein determining the validity of the first plurality of commands comprises:
determining that the first value associated with the first verification signature matches the second value associated with the second verification signature; and
determining at least the first plurality of commands is valid.

3. The method of claim 2, wherein determining at least the first plurality of commands is valid results in at least one of determining that the first plurality of commands is authorized for execution by the GPU, determining an integrity of the first plurality of commands, or determining that the first plurality of commands does not include unauthorized alterations.

4. The method of claim 1, wherein determining the validity of the first plurality of commands comprises:
determining that a value of at least one verification signature associated with at least one command within the command buffer does not match a generated value for the at least one verification signature; and
determining the at least one command is invalid based on determining that the value of the at least one verification signature does not match the generated value for the at least one verification signature.

5. The method of claim 4, wherein determining the at least one command is invalid results in at least one of determining that the at least one command is unauthorized for execution by the GPU or determining that the at least one command includes one or more unauthorized alterations.

6. The method of claim 4, further comprising:
based on the at least one command being invalid, preventing at least one of execution of the at least one command at the GPU or completion of a current execution of the at least one command at the GPU.

7. The method of claim 1, wherein the validity of at least the first plurality of commands is determined during a runtime execution of at least one of the first plurality of commands or a software application associated with the first plurality of commands.

8. The method of claim 1, wherein the first value and the second value are generated based on at least one of a number of commands in the first plurality of commands, a number of one or more types of commands in the first plurality of commands, a content of at least one command of the first plurality of commands, or one or more indirect pointers included in the first plurality of commands, the one or more indirect pointers comprising one or more references to one or more additional commands.

9. The method of claim 1, wherein the first verification signature and the first value are generated by at least one of a user space device driver or a kernel space driver, and wherein the second verification signature and the second value are generated by at least one of a command processor associated with the GPU, a shader processor associated with the GPU, or a processor authorized to at least one of create command streams or manipulate command streams.

10. The method of claim 1, wherein the first plurality of commands and the second plurality of commands comprise at least one of a command stream, a shader program, a command referencing the shader program, or one or more pointers to one or more locations in memory associated with at least one of the first plurality of commands or the second plurality of commands.

11. The method of claim 1, further comprising determining the first location of the first verification signature within the command buffer as a function of the one or more characteristics of the first plurality of commands by at least one of:
  inserting the first verification signature in the command buffer after every predetermined number of commands in the command buffer;
  inserting the first verification signature in the command buffer after every predetermined kilobytes of data;
  inserting the first verification signature in the command buffer after every predetermined number of a type of command;
  inserting the first verification signature in the command buffer at one or more pseudo random locations;
  inserting the first verification signature in the command buffer at the first location calculated as a factor of one or more characteristics of the first plurality of commands, wherein the one or more characteristics of the first plurality of commands comprise one or more of a payload in a command, a size of the first plurality of commands, or a pattern of commands in the first plurality of commands; or
  inserting the first verification signature in the command buffer at the first location calculated as a factor of a runtime condition.

12. The method of claim 1, further comprising receiving, by the GPU, a command including a verification signature, wherein the verification signature is included in a final location within command buffer.

13. An apparatus comprising:
  memory; and
  one or more processors coupled to the memory, the one or more processors being configured to:
    receive a first plurality of commands stored in a command buffer;
    receive a first verification signature stored in a first location within the command buffer between a first command and a second command, the first verification signature comprising a first value for verifying integrity of at least the first plurality of commands, wherein the first value is generated based on the first plurality of commands, and wherein the first location of the first verification signature within the command buffer is calculated as a function of one or more characteristics of the first plurality of commands to obscure the first location from being identified;
    generate a second verification signature associated with the first plurality of commands, the second verification signature comprising a second value generated by the one or more processors based on the first plurality of commands;
    determine a validity of at least the first plurality of commands based on a comparison of the first value of the first verification signature and the second value of the second verification signature;
    execute the first plurality of commands to perform a first plurality of operations based on determining the validity of at least the first plurality of commands;
    receive a second plurality of commands stored in the command buffer, the second plurality of commands sequentially following the first plurality of commands in the command buffer;
    receive a third verification signature stored within a second location of the command buffer, the third verification signature comprising a third value for verifying integrity of at least the second plurality of commands, wherein the third value is generated based on the second plurality of commands, and wherein the second location of the third verification signature within the command buffer is calculated as a function of one or more characteristics of the second plurality of commands to obscure the second location from being identified;
    generate a fourth verification signature associated with the second plurality of commands, the second verification signature comprising a fourth value generated by the one or more processors based on the second plurality of commands;
    determine a validity of at least the second plurality of commands based on a comparison of the third value of the third verification signature and the fourth value of the fourth verification signature; and
    execute the second plurality of commands to perform a second plurality of operations based on determining the validity of at least the second plurality of commands.

14. The apparatus of claim 13, wherein, to determine the validity of the first plurality of commands, the one or more processors are configured to:
  determine that the first value associated with the first verification signature matches the second value associated with the second verification signature; and
  determine at least the first plurality of commands is valid.

15. The apparatus of claim 14, wherein, to determine the first plurality of commands are valid, the one or more processors are configured to at least one of determine that the first plurality of commands is authorized for execution by the one or more processors, determine an integrity of the first plurality of commands, or determine that the first plurality of commands does not include unauthorized alterations.

16. The apparatus of claim 13, wherein, to determine the validity of the first plurality of commands, the one or more processors are configured to:
  determine that a value of at least one verification signature associated with at least one command within the command buffer does not match a generated value for the at least one verification signature; and
  determine the at least one command is invalid based on determining that the value of the at least one verification signature does not match the generated value for the at least one verification signature.

17. The apparatus of claim 16, wherein, to determine the at least one command is invalid, the one or more processors are configured to at least one of determine that at least one command is unauthorized for execution by the one or more processors or determine that the at least one command includes one or more unauthorized alterations.

18. The apparatus of claim 16, the one or more processors being configured to:
  prevent, based on the at least one command being invalid, at least one of execution of the at least one command at the one or more processors or completion of a current execution of the at least one command at the one or more processors.

19. The apparatus of claim 13, wherein the one or more processors are configured to determine the validity of at least the first plurality of commands during a runtime execution of at least one of the first plurality of commands or a software application associated with the first plurality of commands.

20. The apparatus of claim 13, wherein the one or more processors are configured to generate the first value and the second value based on at least one of a number of commands in the first plurality of commands, a number of one or more types of commands in the first plurality of commands, a content of at least one command of the first plurality of commands, or one or more indirect pointers included in the first plurality of commands, the one or more indirect pointers comprising one or more references to one or more additional commands.

21. The apparatus of claim 13, wherein the first verification signature and the first value are generated by at least one of a user space device driver, a kernel space driver, or a processor authorized to at least one of create command streams or manipulate command streams, and wherein the second verification signature and the second value are generated by at least one of a command processor associated with the one or more processors or a shader processor associated with the one or more processors.

22. The apparatus of claim 21, wherein the validity of the first plurality of commands and the second plurality of commands is determined using at least one of the command processor or the shader processor.

23. The apparatus of claim 13, wherein the first plurality of commands and the second plurality of commands comprise at least one of a command stream, a shader program, a command referencing the shader program, or one or more pointers to one or more locations in memory associated with at least one of the first plurality of commands or the second plurality of commands.

24. The apparatus of claim 13, wherein the one or more processors are configured to determine the validity of the first plurality of commands during a runtime execution of a software application associated with the first plurality of commands and prior to at least one of an execution of the first plurality of commands or a completion of first plurality of operations associated with the first plurality of commands.

25. The apparatus of claim 13, wherein the apparatus is a mobile device.

26. The apparatus of claim 13, further comprising a display device.

27. The apparatus of claim 13, wherein, to determine the first location of the first verification signature within the command buffer as a function of the one or more characteristics of the first plurality of commands, the one or more processors are configured to at least one of:
   insert the first verification signature in the command buffer after every predetermined number of commands in the command buffer;
   insert the first verification signature in the command buffer after every predetermined kilobytes of data;
   insert the first verification signature in the command buffer after every predetermined number of a type of command;
   insert the first verification signature in the command buffer at one or more pseudo random locations;
   insert the first verification signature in the command buffer at the first location calculated as a factor of one or more characteristics of the first plurality of commands, wherein the one or more characteristics of the first plurality of commands comprise one or more of a payload in a command, a size of the first plurality of commands, or a pattern of commands in the first plurality of commands; or
   insert the first verification signature in the command buffer at the first location calculated as a factor of a runtime condition.

28. The apparatus of claim 13, wherein the one or more processors are configured to receive a command including a verification signature, wherein the verification signature is included in a final location within command buffer.

29. The apparatus of claim 13, wherein the one or more processors include a graphics processing unit (GPU).

30. A non-transitory computer-readable medium having stored thereon instructions which, when executed by one or more processors, cause the one or more processors to:
   receive a first plurality of commands stored in a command buffer;
   receive a first verification signature stored in a first location within the command buffer between a first command and a second command, the first verification signature comprising a first value for verifying integrity of at least the first plurality of commands, wherein the first value is generated based on the first plurality of commands, and wherein the first location of the first verification signature within the command buffer is calculated as a function of one or more characteristics of the first plurality of commands to obscure the first location from being identified;
   generate a second verification signature associated with the first plurality of commands, the second verification signature comprising a second value generated by a graphics processing unit (GPU) based on the first plurality of commands;
   determine a validity of at least the first plurality of commands based on a comparison of the first value of the first verification signature and the second value of the second verification signature;
   execute the first plurality of commands to perform a first plurality of operations based on determining the validity of at least the first plurality of commands;
   receive a second plurality of commands stored in the command buffer, the second plurality of commands sequentially following the first plurality of commands in the command buffer;
   receive a third verification signature stored within a second location of the command buffer, the third verification signature comprising a third value for verifying integrity of at least the second plurality of commands, wherein the third value is generated based on the second plurality of commands, and wherein the second location of the third verification signature within the command buffer is calculated as a function of one or more characteristics of the second plurality of commands to obscure the second location from being identified;
   generate a fourth verification signature associated with the second plurality of commands, the second verification signature comprising a fourth value generated by the GPU based on the second plurality of commands;
   determine a validity of at least the second plurality of commands based on a comparison of the third value of the third verification signature and the fourth value of the fourth verification signature; and execute the second plurality of commands to perform a second plurality of operations based on determining the validity of at least the second plurality of commands.

\* \* \* \* \*